M. D. MURRAY.
AUTOMATIC TIRE PUMP.
APPLICATION FILED SEPT. 15, 1916.
1,254,526.
Patented Jan. 22, 1918.
2 SHEETS—SHEET 1.
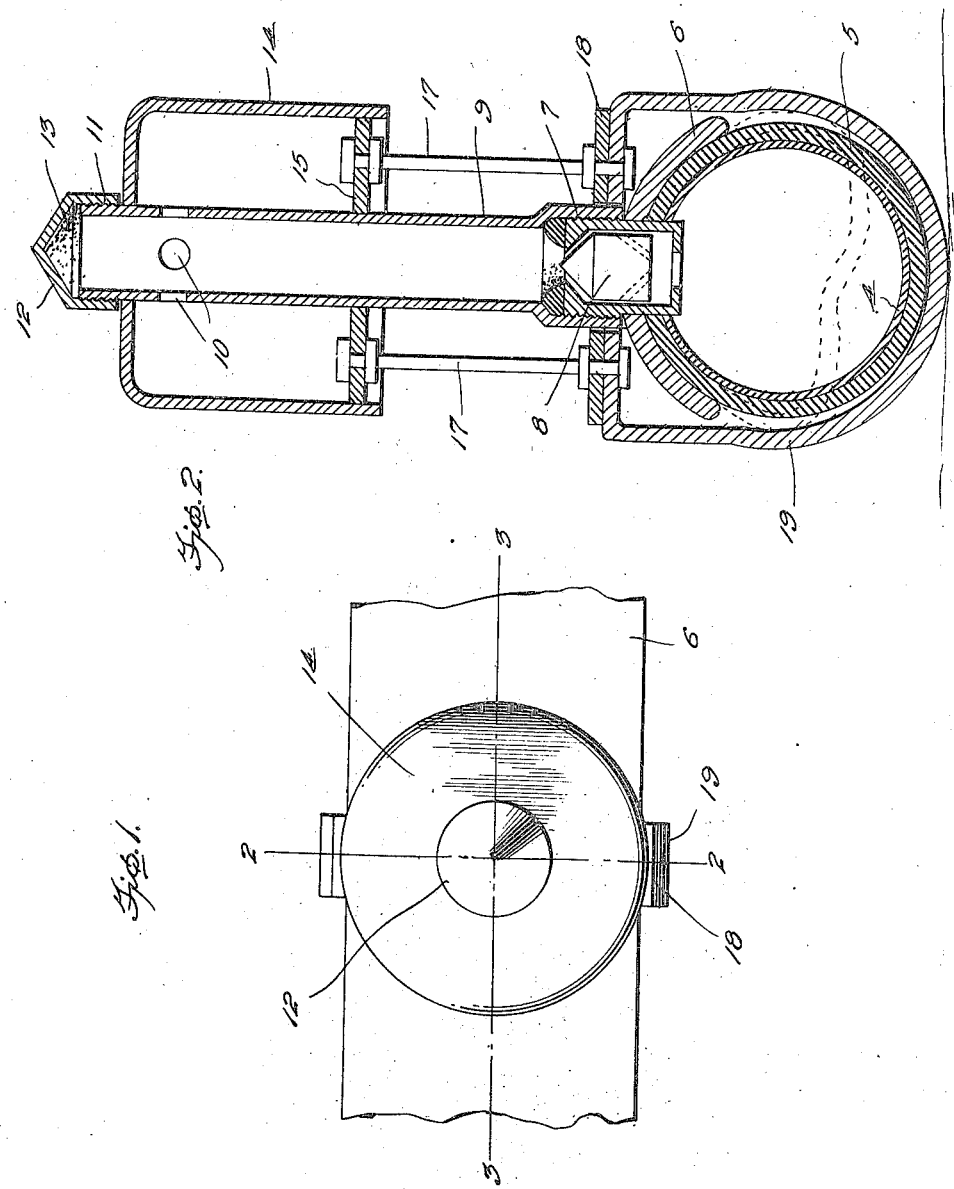
Inventor
M. D. Murray.
By John Louis Waters
Attorney

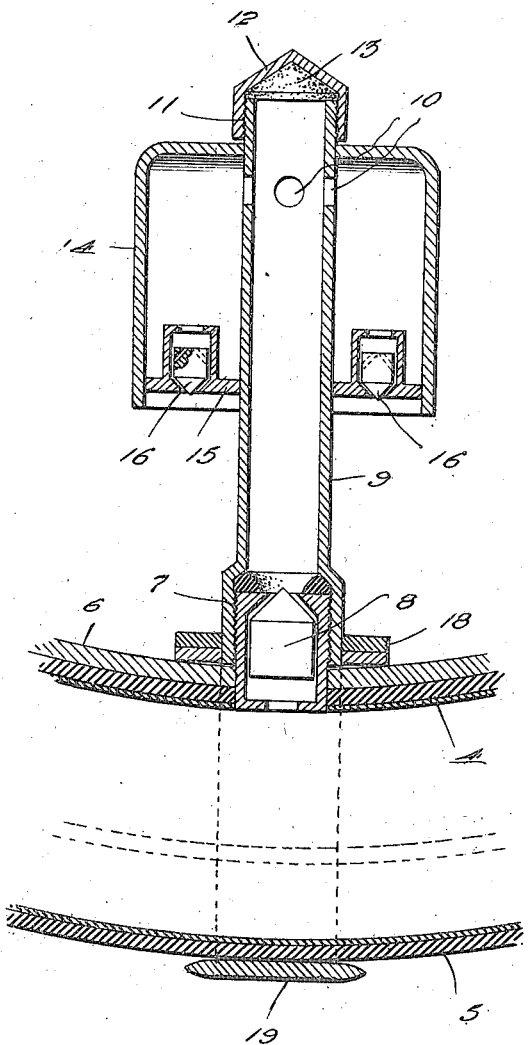

UNITED STATES PATENT OFFICE.

MICHAEL D. MURRAY, OF AMBRIDGE, PENNSYLVANIA.

AUTOMATIC TIRE-PUMP.

1,254,526.  Specification of Letters Patent.  Patented Jan. 22, 1918.

Application filed September 15, 1916.   Serial No. 120,307.

*To all whom it may concern:*

Be it known that I, MICHAEL D. MURRAY, a citizen of the United States, residing at Ambridge, in the county of Beaver and State of Pennsylvania, have invented certain useful Improvements in Automatic Tire-Pumps, of which the following is a specification, reference being had therein to the accompanying drawing.

This invention relates to improvements in automatic tire pumps, one object of the invention being the provision of a device of this character which will automatically pump or inject air into a pneumatic tire while the wheel is revolving and is in contact with the surface traversed.

A further object of this invention is to produce an automatic pump which will intermittently pump air into a partially deflated pneumatic tire, while the wheel of the vehicle is revolving, and also to cause the pneumatic tire to become filled to a desired air pressure whenever the tire becomes partially deflated from any cause whatsoever.

A still further object of this invention is the provision of a device of this character which is readily connected in place upon pneumatic tired vehicles, and which is simple, durable and inexpensive in construction and thoroughly efficient and practical in use.

With the above and other objects in view and which will be more readily understood as the invention becomes known, the invention consists in the new and novel construction, combination and arrangement of parts, as hereinafter more specifically described and illustrated in the accompanying drawings, wherein is shown an embodiment of the invention, but it is to be understood that changes, variations, and modifications can be resorted to which come within the scope of what is claimed.

In the accompanying drawings:—

Figure 1 is a top plan view of the pump showing a pneumatic tire partly in section.

Fig. 2 is a section taken on line 2—2 of Fig. 1.

Fig. 3 is a cross section taken on line 3—3 of Fig. 1.

Referring to the drawings, the numeral 4 designates the inner tube, and 5 the outer casing of a pneumatic tire, while 6 indicates the rim of the wheel provided with an opening for the reception of the threaded pump connection 7 carrying the valve 8, all of ordinary construction.

The pump connection 7 is threadedly engaged by a screw-threaded stem 9 which is provided with openings 10 therein. The outer end of this stem 9 is threaded and a cap 12 screws down upon this threaded portion and confines a suitable packing 13 in place upon this stem 9.

Attached to the stem 9 is a tubular or cup shaped member 14 which surrounds the stem and incases the piston 15 which is here shown as provided with two valves 16 and two driving rods 17.

The cross bar 18 is secured to the two driving rods and frames and part of the yoke 19 which encircles the tire 5 and the rim 6.

In operation, the yoke 19 encircles and surrounds the pneumatic tire 5, the tire being slightly deflated so that the parts will assume the dotted line position, as shown in Figs. 2 and 3, with the yoke 19 resting upon the surface traversed so that the weight of the vehicle is supported by the yoke 19 and the tire, the piston 15 being disposed at the upper end of the cup-shaped member 14, so that when the wheel is rotated, each time that the yoke 19 engages the surface traversed, the piston will be pushed upwardly to be freed for downward movement by the pressure of the air within the tire, so that air will enter through the valves 16 into the casing 14 to be driven through the port 10 of the stem 9 and beyond the valve 8 into the inner tube. This intermittent action will cause the inflation of the tire so that the continued forward motion of the vehicle will automatically operate the pump to maintain the tire properly inflated.

It will be understood that as the tire 5 is fully inflated and cannot be depressed to any appreciable extent by the weight of a vehicle on the yoke 19, any movement on the part of the piston 15 will not compress the air in the pump cylinder and therefore no air can be pumped into the tire.

Instantly that the tire becomes partially deflated and the wheel is in motion, the above set forth operation will take place and air will be forced into the tire.

The present device can be readily applied to pneumatic tires used upon motor vehicles, motor-cycles, and bicycles, and will automatically operate to inflate the tires during the movement of such vehicles.

What I claim as new is:—

In a device of the character described, in combination, a wheel rim, a pneumatic tire mounted upon said rim, a threaded pump connection secured in said tire and rim and having a valve seat, a valve in said pump connection, a tubular stem threadedly secured at one end to said pump connection, a rigid yoke consisting of an inner flat base portion engageable with said rim and an outer segmental portion engaging said tire, a cup-shaped member attached to said stem near its upper end, the extreme upper end of said stem being threaded, a gasket seated on the outer edge of said stem, a cap threaded on the threaded end of said stem and compressing said gasket, said stem having openings formed therein so as to communicate with the interior of said cup-shaped member, a pair of rods secured to the base of said yoke, and a piston fitting said cup-shaped member, so as to close the same, being secured to said rods and provided with air-inlet valves.

In testimony whereof I affix my signature.

MICHAEL D. MURRAY.

Copies of this patent may be obtained for five cents each, by addressing the "Commissioner of Patents, Washington, D. C."